(12) United States Patent
Flynn

(10) Patent No.: US 8,047,747 B2
(45) Date of Patent: Nov. 1, 2011

(54) ROTARY CUTTING TOOL

(75) Inventor: Clifford Flynn, Pittsfield, MA (US)

(73) Assignee: Dauphin Precision Tool, LLC, Millersburg, PA (US)

(*) Notice: Subject to any disclaimer, the term of this patent is extended or adjusted under 35 U.S.C. 154(b) by 30 days.

(21) Appl. No.: 11/678,337

(22) Filed: Feb. 23, 2007

(65) Prior Publication Data

US 2008/0206003 A1   Aug. 28, 2008

(51) Int. Cl.
*B26D 1/00* (2006.01)
*B23C 5/10* (2006.01)

(52) U.S. Cl. ............... 407/53; 407/60; 407/61

(58) Field of Classification Search .............. 407/53, 407/58, 60, 61
See application file for complete search history.

(56) References Cited

U.S. PATENT DOCUMENTS

| | | | |
|---|---|---|---|
| 1,840,852 A | 1/1932 | Schotthoefer | |
| 3,133,339 A | 5/1964 | Ribich | 29/103 |
| 3,775,819 A | 12/1973 | Ribich | 29/103 |
| 4,083,643 A * | 4/1978 | Parone | 407/59 |
| 4,174,915 A * | 11/1979 | Peetz et al. | 407/59 |
| 4,212,568 A * | 7/1980 | Minicozzi | 407/53 |
| 4,285,618 A * | 8/1981 | Shanley, Jr. | 407/54 |
| 4,560,308 A * | 12/1985 | Deller | 407/53 |
| 4,573,831 A | 3/1986 | Lacey | |
| 5,160,232 A | 11/1992 | Maier | 408/223 |
| 5,213,452 A | 5/1993 | Kirby | |
| 5,282,707 A | 2/1994 | Palm | 411/3 |
| 6,715,966 B2 * | 4/2004 | Tsuzuki et al. | 407/53 |
| 7,563,059 B2 | 7/2009 | Song | |

FOREIGN PATENT DOCUMENTS

WO    WO 03/039797    5/2003

* cited by examiner

*Primary Examiner* — Will Fridie, Jr.
(74) *Attorney, Agent, or Firm* — O'Shea Getz P.C.

(57) ABSTRACT

A rotary cutting tool is provided having an axis of rotation, a shank section, a fluted section, and a plurality of helical teeth. The shank section and the fluted section both extend along the axis of rotation. The fluted section has a first end integrally attached to the shank section, a second end, and an outer surface extending between the first and second ends. A plurality of helical teeth is disposed along the outer surface, each having a cutting edge and an undulating geometry. The helical teeth are arranged so that rotationally successive cutting edges are sufficiently dissimilar relative to one another to inhibit a detrimental periodic response in the rotary cutting tool.

6 Claims, 4 Drawing Sheets

ROTARY CUTTING TOOL

BACKGROUND OF THE INVENTION

1. Technical Field

The present invention relates to machine tool rotary cutting tools in general, and to end mills in particular.

2. Background Information

An end mill is an example of a rotary cutting tool that is used to remove material from a workpiece. Conventional end mills typically include a shank section and a fluted section. The fluted section typically includes a plurality of helical teeth, each tooth having a cutting surface and a relief wall. It is desirable to have an end mill that can rapidly remove material from a workpiece, while at the same time leave a relatively smooth surface on the workpiece. To that end, there are a variety of different end mill designs. U.S. Pat. No. 4,560,308 discloses an end mill with a plurality of helical teeth each with a sinusoidal edge that facilitates chip formation and removal. The '308 patent also discloses that the sinusoidal pattern is the same for each helical tooth, although the sinusoidal patterns may be axially offset from one another relative to the end of the end mill; e.g., the sinusoidal pattern for a first helical tooth begins at the tip of the mill; the sinusoidal pattern for a second helical tooth, that rotationally follows the first helical tooth, begins at a point located a distance "x" apart from the tip; and the sinusoidal pattern for a third helical tooth, that rotationally follows the second helical tooth, begins at a point located a distance "2x" apart from the tip, etc.

Rotary cutting tools are often subject to periodic forces as cutting edges repeatedly engage with the workpiece. The aforesaid forces can lead to undesirable harmonic responses (e.g., noise, chatter), particularly if the periodic forces are substantially uniform. A substantial harmonic response can limit the performance of the rotary cutting tool, including the finish produced by the tool.

Modern machining centers often utilize greater horsepower than older machining centers and very often include computer controls. The additional power and computer control enables the machining center to employ faster feed rates, provided the rotary cutting tool utilized by the machining center can accommodate the greater forces associated therewith.

What is needed, therefore, is a rotary cutting tool that has improved characteristics relative to the prior art rotary cutting tools currently available, and one that can accommodate the forces associated with higher than conventional feed rates without a detrimental harmonic response.

SUMMARY OF THE INVENTION

According to the present invention, a rotary cutting tool is provided having an axis of rotation, a shank section, a fluted section, and a plurality of helical teeth. The shank section and the fluted section both extend along the axis of rotation. The fluted section has a first end integrally attached to the shank section, a second end, and an outer surface extending between the first and second ends. A plurality of helical teeth is disposed along the outer surface, each having a cutting edge and an undulating geometry. The helical teeth are arranged so that rotationally successive cutting edges are sufficiently dissimilar relative to one another to inhibit a periodic response in the rotary cutting tool.

An advantage of the present invention rotary cutting tool is that the rotary cutting tool is designed to avoid an undesirable periodic response (e.g., chatter, noise, etc.) that may occur during use. Successive helical teeth within the present rotary cutting tool have different undulating geometries. As a result, the load experienced by a helical tooth while cutting a workpiece is not substantially the same as that experienced by the previous helical tooth, and the potential for an undesirable periodic response is mitigated. The different undulating geometries disclosed herein are particularly advantageous for a rotary cutting tool that is used with greater than conventional feed rates. Conventional rotary cutting tool geometries that are not problematic using conventional feed rates, can be problematic when a higher than conventional feed rate is used. The present invention rotary cutting tool is operable with higher than conventional feed rates.

Another advantage provided by the present invention rotary cutting tool is that the differences in successive helical teeth enhance workpiece chip formation and removal during milling. For example, the differences in successive helical teeth permit complimentary helical tooth geometries to work together to optimize chip formation, cutting fluid passage, and chip removal.

These and other objects and advantages will become more readily apparent from the more detailed discussion of the preferred embodiment taken in conjunction with the drawings wherein similar elements are identified by like numerals through several views.

DETAILED DESCRIPTION OF THE INVENTION

Figure 1:
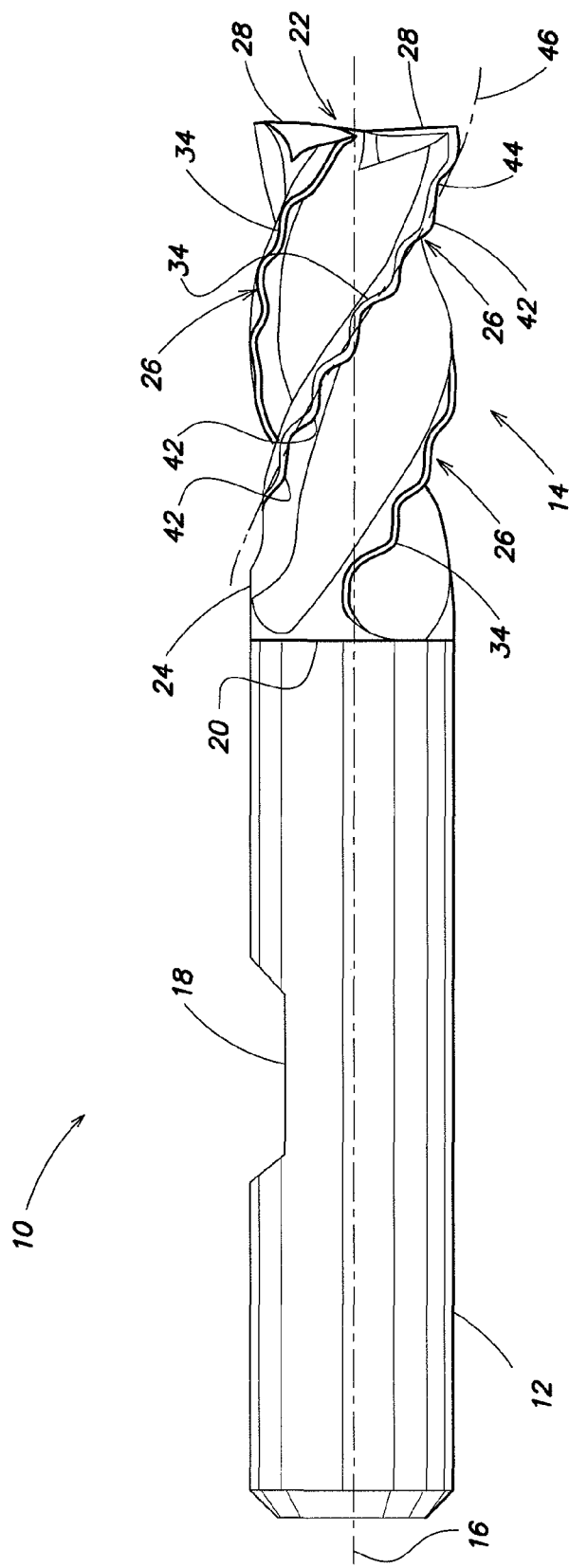
FIG. 1 is a side view of an end mill according to the present invention.

Now referring to FIG. 1, a rotary cutting end mill 10 is shown that includes a shank section 12 and a fluted section 14, both of which extend along an axis of rotation 16. The end mill 10 is an example of a rotary cutting tool and the present invention is not limited to end mills. The shank section 12 is cylindrical. In some embodiments, the shank section 12 includes one or more grooves 18 cut into its outer surface to facilitate retention of the end mill 10 within the rotary driven apparatus (e.g., a milling machine). Acceptable end mill 10 materials include high strength steel/cobalt, ceramics, carbides, etc.

The fluted section 14 of end mill 10 has a first end 20 integrally attached to the shank section 12, a second end 22 (also referred to as the "tip"), and an outer surface 24. A plurality of helical teeth 26 is disposed along the outer surface 24 of the fluted section 14. FIG. 1 illustrates an embodiment having four helical teeth 26. Each helical tooth 26 also includes a tip cutting edge 28 that engages the workpiece when the end mill 10 is plunged into the workpiece. The tip cutting edges 28 are disposed at an angle relative to the rotational axis 16 of the end mill 10 to create a relief that facilitates chip removal.

Figure 2:
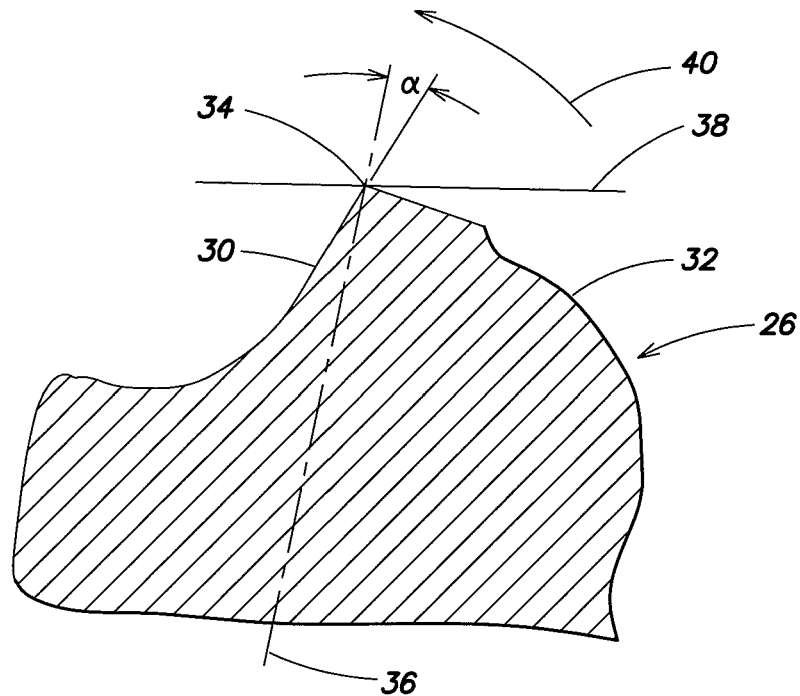
FIG. 2 is a diagrammatic sectional view of a helical tooth having a negative rake angle.
Figure 3:
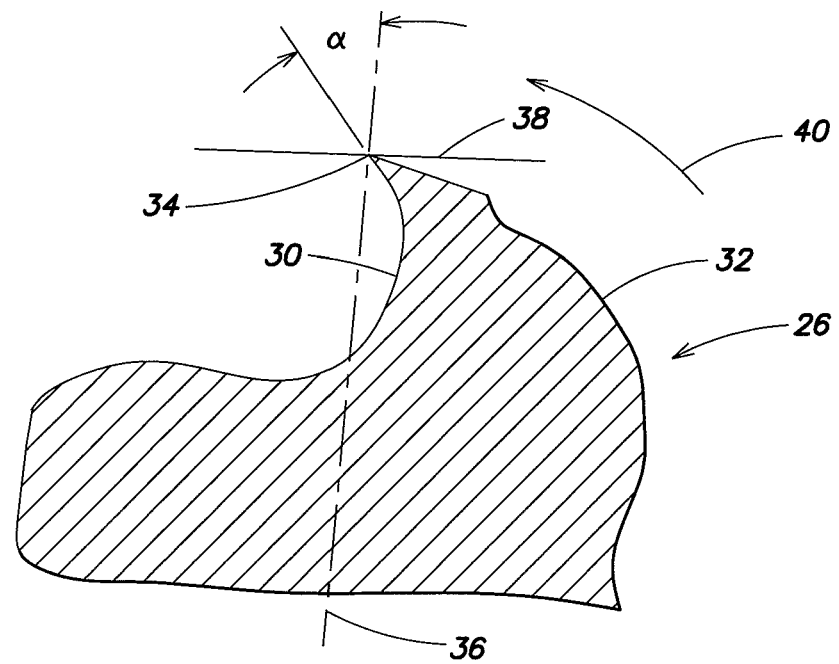
FIG. 3 is a diagrammatic sectional view of a helical tooth having a positive rake angle.

Referring to FIGS. 2 and 3, each helical tooth 26 has a cutting surface 30 and a relief wall 32 that intersect to form a helical cutting edge 34. The cutting surface 30 extends between the helical cutting edge 34 and an inflection point of the flute curvature; i.e., where the concave shape of the cutting surface 30 of one tooth 26 changes to the convex shape of the relief wall 32 of the next tooth 26. For purposes of this description, the radial rake of the helical cutting edge is defined as the orientation of the cutting surface 30 relative to the helical cutting edge 34; e.g., the radial rake is considered to be positive if the cutting surface 30 trails the helical cutting edge 34 in the cutting direction of the end mill 10, and is considered to be negative if the cutting surface 30 leads the helical cutting edge 34 in the cutting direction of the end mill 10. The amount of rake (i.e., the rake angle "α") is determined by the included angle formed between a radius line 36 passing through a point on the helical cutting edge 34 and a line 38 tangent to the rake face which lies in the diametrical plane and passes through the same point on the helical cutting edge 34. The helical cutting edge 34 defines an outer circumferential cutting path; i.e., the outermost edge contacting the work piece. Arrow 40 indicates the rotational direction of the end mill 10. The helical cutting edge 34 typically extends between the first and second ends 20, 22 of the fluted section 14. A variety of different relief wall 32 configurations can be used with the present invention end mill 10 and the present end mill 10 is not, therefore, limited to any particular configuration.

It is known within the prior art to have helical teeth with a sinusoidal geometry. U.S. Pat. No. 4,560,308, for example, discloses an end mill with each helical tooth having the same generally sinusoidal geometry consisting of uniformly spaced peaks and valleys. An end mill having multiple helical teeth, each having substantially the same cutting edge geometry, will experience substantially similar loads as the end mill rotationally engages the workpiece. The circumferentially uniform spacing of the helical teeth causes the similar loads to be applied periodically, thereby creating the opportunity for an undesirable periodic response (e.g., chatter, noise, etc.). The '308 patent further discloses a pattern of successive similar cutting edges that are slightly longitudinally staggered relative to the tip. The slight longitudinal stagger is said to present a constantly varying angle of attack to the workpiece. Nevertheless, the amount of stagger is not likely to appreciably change the substantially similar loading experienced by the teeth, and consequently not likely to prevent an undesirable periodic response that may occur under certain circumstances.

Referring to FIGS. 1-3, each helical tooth 26 of the present invention has a cutting edge 34 with an undulating geometry that includes a plurality of peaks 42 and valleys 44 relative to a helical line 46 on which the helical tooth 26 is substantially aligned. The undulating geometry of each tooth may be periodic (e.g., in the form of a sinusoidal wave), non-periodic, or some combination of periodic and non-periodic geometries. The geometry of the cutting surface 30 will vary depending on its location along the undulating geometry of the cutting edge 34; e.g., a cutting surface 30 that leads the cutting edge 34 (e.g., FIG. 2) will have a negative rake angle, and a cutting surface 30 that trails the cutting edge 34 (e.g., FIG. 3) will have a positive rake angle. A cutting edge 34 embodiment with an undulating geometry may have some cutting surface 30 leading the cutting edge 34 and some cutting surface 30 trailing the cutting edge 34 (e.g., see FIG. 1). Alternatively, a cutting edge 34 embodiment with an undulating geometry may include a cutting surface 30 that only leads the cutting edge 34, or one wherein the cutting surface 30 only trails the cutting edge 34.

The helical teeth 26 of the present invention rotary cutting tool 10 include at least two teeth, each having a cutting edge geometry different from that of another tooth. The difference (s) in cutting edge geometries is such that the different cutting edge geometry teeth will experience different loadings under the same operating circumstances. The helical teeth 26 are arranged so that the load experienced by a first helical tooth 26 while cutting a workpiece is not substantially the same as that experienced by a rotationally successive second helical tooth 26. The difference in loading between successive teeth 26 is enough such that an undesirable harmonic response is inhibited from occurring during operation with conventional or non-conventional feed rates. The arrangement of helical teeth 26, and the loadings associated therewith, can be tailored to suit particular applications by modifying the cutting edge geometries.

Figure 4:
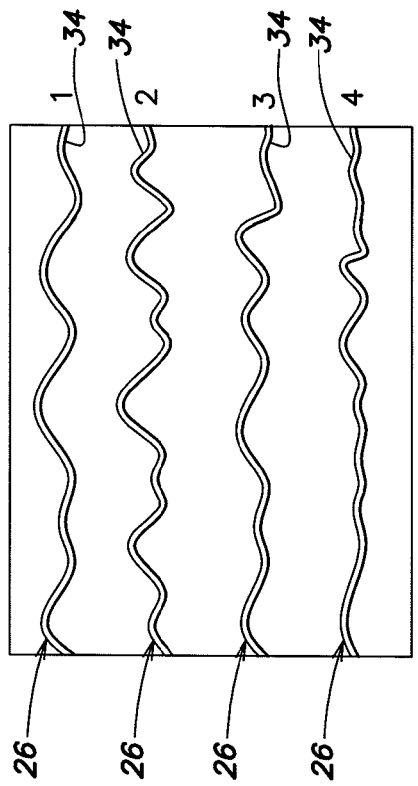
FIG. 4 is a diagrammatic planar view of an embodiment of the cutting edges of a rotary cutting tool having four helical teeth.

To illustrate the present invention, helical teeth 26 cutting edge geometries are described hereinafter in terms of an end mill 10 having four helical teeth 26. As stated above, the present invention is not limited to end mills or rotary cutting tools having four teeth 26, however, and may be used on a variety of rotary cutting tools having a plurality of teeth 26. In a first embodiment, a rotary end mill 10 having four helical teeth 26 includes at least one helical tooth 26 having a periodic undulating geometry (e.g., sinusoidal), and at least one helical tooth 26 having a non-periodic undulating geometry. FIG. 4 diagrammatically illustrates a four tooth end mill 10 having a first and a third helical tooth 26 having the same sinusoidal cutting edge 34 geometry, and a second and fourth helical tooth 26 having the same non-periodic cutting edge geometry.

Figure 5:
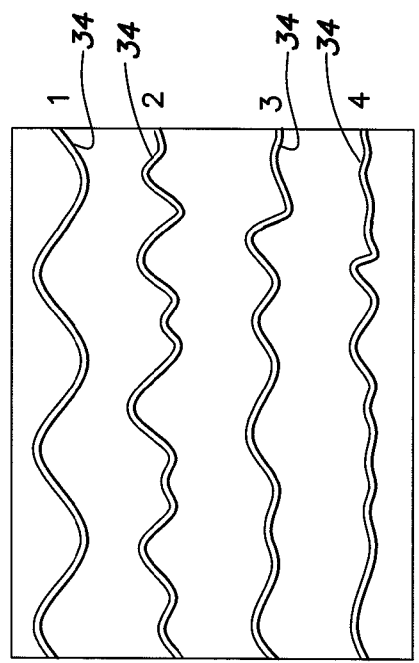
FIG. 5 is a diagrammatic planar view of an embodiment of the cutting edges of a rotary cutting tool having four helical teeth.

FIG. 5 diagrammatically illustrates an end mill 10 embodiment having four helical teeth 26, each with a periodic sinusoidal cutting edge geometry. The period and amplitude of the sinusoidal cutting edge 34 geometries sufficiently differ between teeth 26 so that the load experienced by each successive helical tooth 26 is not substantially the same as that experienced by the previous tooth 26. In FIG. 5, the first and third cutting edges 34 have the same sinusoidal cutting edge geometry and the second and fourth cutting edges 34 have the same sinusoidal cutting edge geometry. One or both of the frequency and amplitude of the first and third cutting edges 34 are not equal to those of the second and fourth cutting edges 34.

Figure 6:
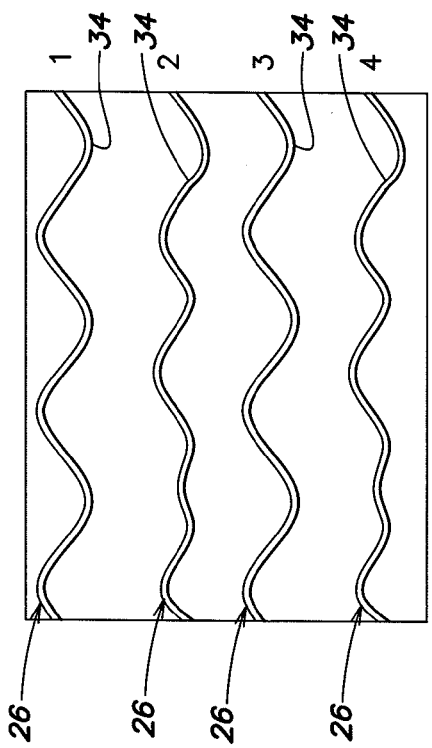
FIG. 6 is a diagrammatic planar view of an embodiment of the cutting edges of a rotary cutting tool having four helical teeth.
Figure 7:
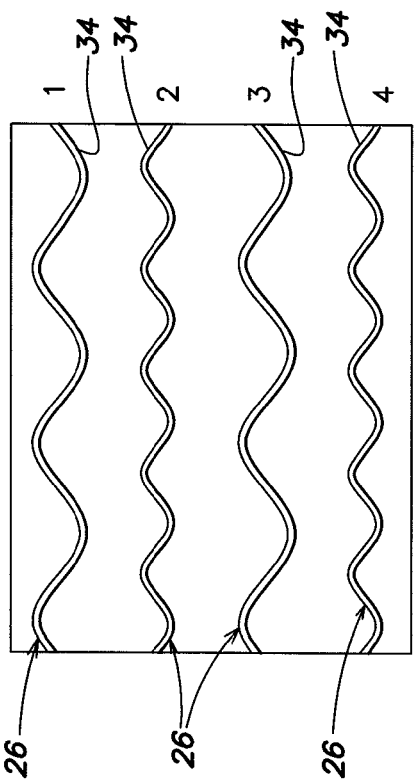
FIG. 7 is a diagrammatic planar view of an embodiment of the cutting edges of a rotary cutting tool having four helical teeth.

FIG. 6 diagrammatically illustrates an end mill 10 embodiment having four helical teeth 26, each with a non-periodic cutting edge geometry and each different from the others. The cutting edge 34 geometries sufficiently differ between teeth 26 so that the load experienced by each successive helical tooth 26 is not substantially the same as that experienced by the previous tooth 26. FIG. 7 diagrammatically illustrates an end mill 10 embodiment having four helical teeth 26, one with a sinusoidal cutting edge 34 geometry and three other each with a different non-periodic cutting edge geometry. The cutting edge 34 geometries sufficiently differ between teeth 26 so that the load experienced by each successive helical tooth 26 is not substantially the same as that experienced by the previous tooth 26.

Figure 8:
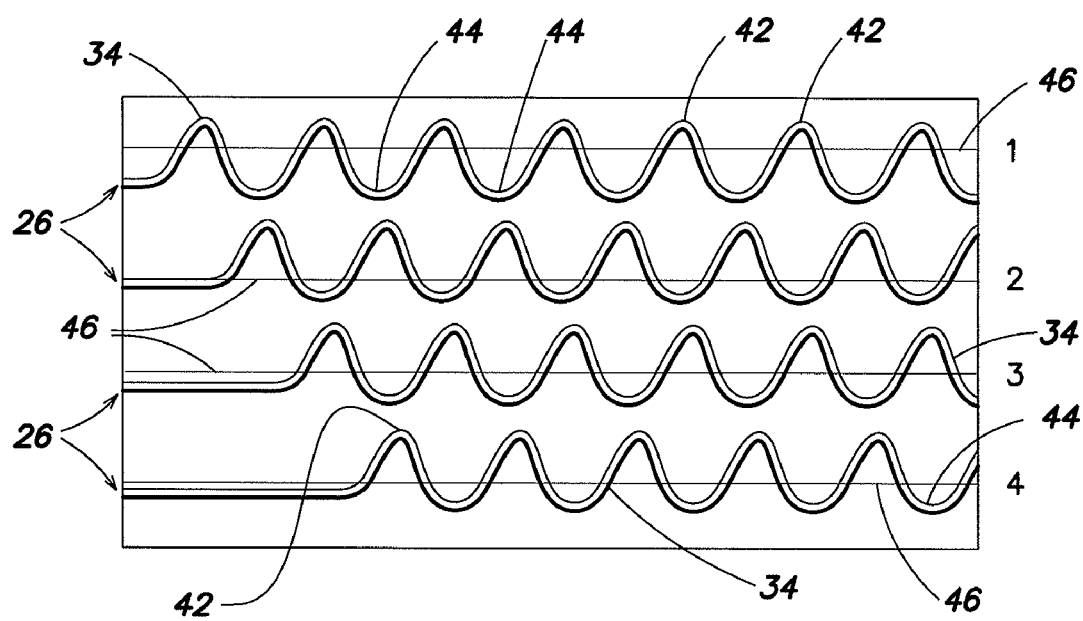
FIG. 8 is a diagrammatic planar view of an embodiment of the cutting edges of a rotary cutting tool having four helical teeth.

FIG. 8 diagrammatically illustrates an end mill 10 embodiment having four helical teeth 26, each with a periodic cutting edge geometry. The geometry of each cutting edge is such that the curvature of the peaks 42 is different from the curvature of the valleys 44 (as opposed to a sinusoidal geometry which is symmetrical between peaks and valleys). For example, the peaks 42 shown in FIG. 8 are elliptically shaped and the valleys 44 are circularly shaped. In addition, the relative curvatures are such that the peaks 42 have a substantially sharper turn radius than do the valleys 44. The helical teeth geometries shown in FIG. 8 are also staggered relative to the tip of the end mill 10; i.e., each helical tooth geometry starts a distance longitudinally further from the tip than the previous tooth, until the pattern repeats itself. The helical tooth geometries shown in FIG. 8 are also positioned variably relative to the centerline 46 of the respective helical tooth to alter the amount of positive and negative rake between the helical tooth geometries, as is further discussed below.

FIG. 2 diagrammatically illustrates a helical cutting tooth 26 having a positive rake angle, and FIG. 3 diagrammatically illustrates a helical cutting tooth 26 having a negative rake angle. In some embodiments, each successive helical tooth 26 has a different rake angle pattern than that of the previous helical tooth 26. The term "rake angle pattern" is used herein to refer to the arrangement of rake angles along the helical cutting edge 34; e.g., a pair of cutting edges 34 having the same sinusoidal geometry would have the same rake angle pattern. The different rake angle patterns of the successive helical teeth 26 are different enough so that an undesirable harmonic response is inhibited from occurring. The difference in rake angle pattern could be accomplished with helical teeth 26 having only positive rake angles, or helical teeth 26 having only negative rake angles, or some combination of positive and negative rake angles.

Although this invention has been shown and described with respect to the detailed embodiments thereof, it will be understood by those skilled in the art that various changes in form and detail thereof may be made without departing from the spirit and the scope of the invention.

What is claimed is:

1. A rotary cutter having an axis of rotation, comprising:
   a shank section extending along the axis of rotation;
   a fluted section extending along the axis of rotation, having a first end integrally attached to the shank section, a second end, and an outer surface; and
   a plurality of helical teeth disposed along the outer surface, including a first helical tooth having a first cutting edge with a first undulating geometry, and a second helical tooth having a second cutting edge with a second undulating geometry, wherein said plurality of helical teeth are arranged so that rotationally successive cutting edges are sufficiently dissimilar relative to one another to inhibit a detrimental periodic response in the rotary cutter, and wherein the first undulating geometry and the second undulating geometry are both non-periodic.

2. The cutter of claim 1, wherein the first cutting edge has a first rake angle pattern, and the second cutting edge has a second rake angle pattern, and the first rake angle pattern is different from the second rake angle pattern.

3. The cutter of claim 2, wherein the first cutting edge has positive rake angles, and the second cutting edge has negative rake angles.

4. A rotary cutter having an axis of rotation, comprising:
   a shank section extending along the axis of rotation;
   a fluted section extending along the axis of rotation, having a first end integrally attached to the shank section, a second end, and an outer surface; and
   a plurality of helical teeth disposed along the outer surface, including a first helical tooth having a first cutting edge with a first undulating geometry, and a second helical tooth having a second cutting edge with a second undulating geometry, wherein said plurality of helical teeth are arranged so that rotationally successive cutting edges are sufficiently dissimilar relative to one another to inhibit a detrimental periodic response in the rotary cutter, and wherein the first undulating geometry is periodic and includes alternating peaks having a first geometry and valleys having a second geometry, and wherein the first geometry and second geometry are dissimilar.

5. A rotary cutter having an axis of rotation, comprising:
   a shank section extending along the axis of rotation;
   a fluted section extending along the axis of rotation, having a first end integrally attached to the shank section, a second end, and an outer surface; and
   a plurality of helical teeth disposed along the outer surface, including a first helical tooth having a first cutting edge with a periodic undulating geometry, and a second helical tooth having a second cutting edge with a non-periodic undulating geometry.

6. A rotary cutter having an axis of rotation, comprising:
   a shank section extending along the axis of rotation;
   a fluted section extending along the axis of rotation, having a first end integrally attached to the shank section, a second end, and an outer surface; and
   a plurality of helical teeth disposed along the outer surface, including a first helical tooth having a first cutting edge with a first sinusoidal geometry having a first pitch and first amplitude, and a second helical tooth having a second cutting edge with a second sinusoidal geometry having a second pitch and second amplitude, wherein the first pitch or first amplitude is greater than the corresponding second pitch or second amplitude.

\* \* \* \* \*